April 6, 1954 — W. F. PHILLIPS — 2,674,349
CONNECTION BETWEEN TRACTOR AND TRAILER
Filed April 22, 1949
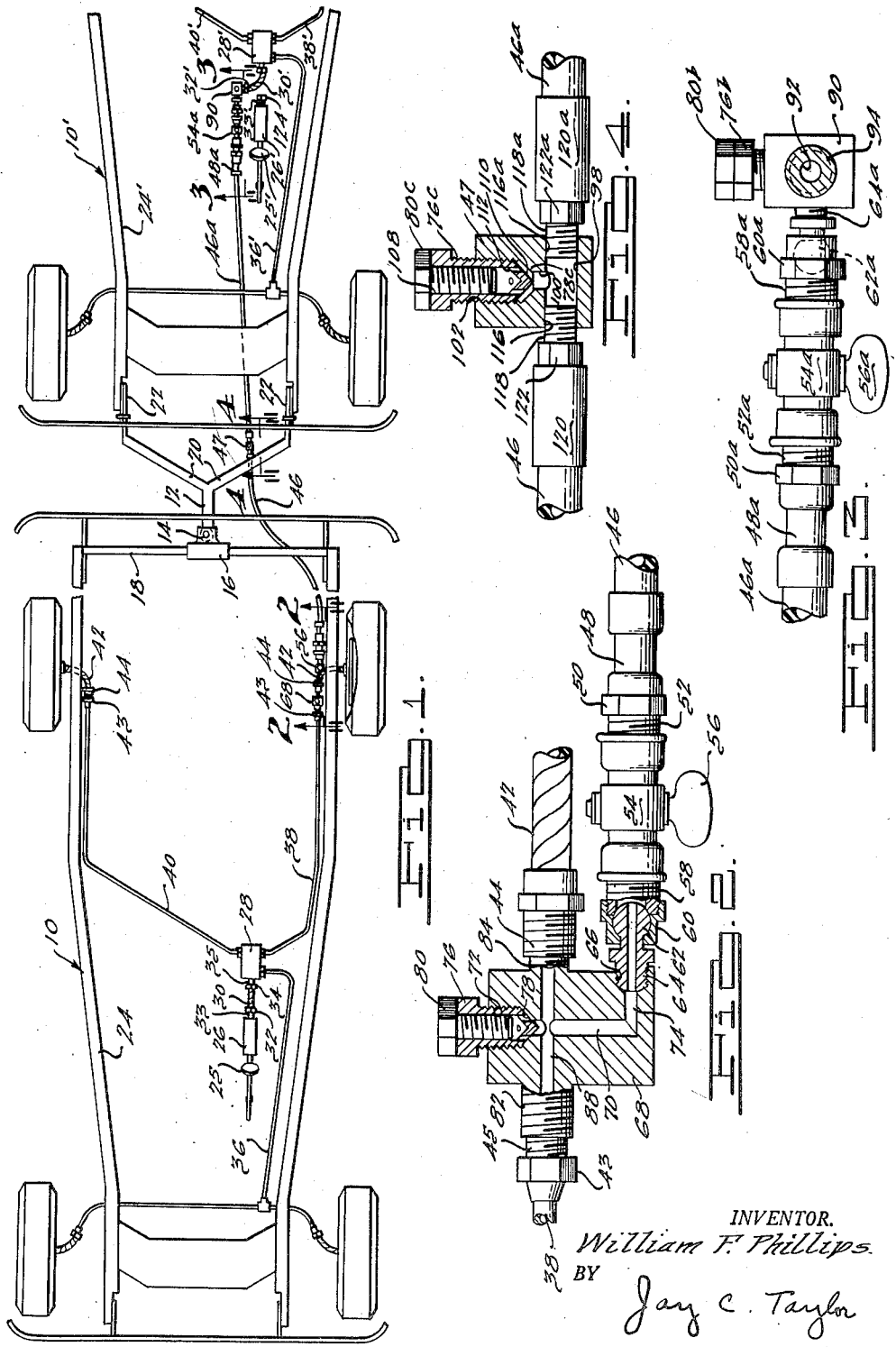
INVENTOR.
William F. Phillips.
BY
Jay C. Taylor
ATTORNEY.

Patented Apr. 6, 1954

2,674,349

UNITED STATES PATENT OFFICE 2,674,349

CONNECTION BETWEEN TRACTOR AND TRAILER

William F. Phillips, Detroit, Mich.

Application April 22, 1949, Serial No. 89,127

5 Claims. (Cl. 188—3)

1

The present invention relates to hydraulic brake control means and in particular to improved means for effecting a coupling between the hydraulic brake systems of a driven automobile and a towed automobile to cause substantially simultaneous application of the brakes of both automobiles upon operation of the brake foot-pedal of the driven automobile.

In transporting motor vehicles across country, as for example newly manufactured passenger automobiles or light trucks from the assembly plant to local distributing points, it is common to secure two vehicles together in tandem. Thus a single driver operating the forward vehicle and towing the rearward vehicle may readily transport two vehicles simultaneously.

In such situations, the steering apparatus of the towed vehicle is locked in position for steering straight ahead. The two vehicles are suitably pivotally coupled together generally bumper to bumper by rigid means which hold the towed vehicle in linear alignment and in fixed spaced relation with respect to the driven vehicle.

A difficulty that has long confronted such a towing arrangement has been in the provision of suitable braking means under the control of the driver for rapidly stopping the coupled vehicles. It is apparent that sole reliance upon the brakes of the driven vehicle for long distance or cross-country transportation, or even for driving in city traffic, is wholly unsatisfactory for the reason that the added weight of the towed vehicle greatly increases the distance required for stopping the two vehicles. As a result the vehicles must be driven at such slow and cautious speeds that the cost of transportation becomes excessive.

In order to increase the speed at which such cross-country towing may be accomplished with feasibility and safety, it has been conventional to provide a hand brake lever temporarily mountable near the steering wheel of the driven vehicle and accessible for operation by the driver. The hand lever is connected either directly or through a booster mechanism with the brake foot-pedal of the towed vehicle, whereby the latter pedal may be depressed at the discretion of the driver upon manipulation of the hand lever.

In application of this mechanism for stopping the coupled vehicles quickly, it is necessary for the driver to depress the brake foot-pedal of the driven vehicle to apply the brakes thereof and at the same time to remove one hand from the steering wheel to actuate the hand lever to apply the brakes of the towed vehicle. Such a braking

2 system at best is adequate only when there is ample time to complete the stop. Obviously in an emergency when the brakes of the towed vehicle are most required, it may be necessary for the driver to retain both hands on the steering wheel. Thus he will be unable to operate the hand lever for the brakes of the towed vehicle. In other situations he may not have time to manipulate the hand lever, or he may forget entirely about it.

Furthermore, even when the driver does apply the brakes of the towed vehicle through the medium of the hand lever, it is important that the braking force of the two vehicles should be comparable. Otherwise, if the braking force on the driven vehicle is appreciably in excess of the braking force on the towed vehicle, the latter is apt to jack-knife about its coupling with the driven vehicle and throw both vehicles off the road. The danger of jack-knifing is especially great on slippery roads or during a stop on a curve. If the towed vehicle does not jack-knife laterally, it is apt to lift the rear wheels of the driven vehicle from the road, or at least reduce their frictional engagement with the road, so that only the front wheel brakes of the driven vehicle will be available to stop both vehicles. Even when the stop is apparently completed without danger, an uneven distribution of the braking forces on the two vehicles tends to strain or wrench the vehicular frames and bodies and the towing coupling therebetween, as well as cause excessive wearing of the tires and brake linings.

For these reasons, considerable skill is required of the driver, and cross-country towing at high speeds with conventional brake means is unreasonably dangerous both to the driver and to other motorists. Other inherent disadvantages of conventional means for operating the brakes of the towed vehicle are that the equipment required is comparatively expensive as well as complicated, heavy, bulky and thereby awkward and inconvenient to handle and install.

It has accordingly been an important object of the present invention to provide improved means for operating the hydraulically actuated brakes of a towed vehicle simultaneously and in synchronism with the operation of the brakes of the driven vehicle.

Other objects of the invention are to provide improved coupling means which are particularly adapted to be employed as a temporary hydraulic connection between the hydraulic brake systems of a driven automobile and a towed automobile to permit efficient simultaneous, and co-ordinated actuation of the hydraulic brake systems of both automobiles by means of the single brake pedal of the driven automobile under the control of the driver, thereby to facilitate cross-country towing or transportation operation of the foregoing nature with optimum safety at comparatively high speeds; and to provide such coupling means which reduce the requirements of skill and discretion on the part of the driver in applying the brakes; which avoid the necessity of the driver removing one hand from the steering wheel or doing any separate act to apply the brakes of the towed automobile, other than to apply the brakes of the driven automobile in accordance with conventional practice; and which permits stopping the coupled automobiles safely in appreciably less time and distance than heretofore required, with a minimum of damage or strain to the vehicular frames or wear of tires, brake linings, the towing coupling between the vehicles, and the like.

Other objects are to provide coupling means of the foregoing character which are simple in construction and application, lightweight, conveniently portable in a compact container, and readily attachable to or detachable from the existing hydraulic brake systems of the automobiles being transported without in any manner damaging or impairing these brake systems.

Another and more specific object is to provide a coupling means of the foregoing nature comprising a hydraulic conduit, preferably of flexible material, adapted for hydraulically connecting the hydraulic brake systems of both the driven and towed vehicles.

In a preferred construction, the conduit is provided at one end with screw threaded coupling means adapted to tap the hydraulic brake system of the driven vehicle at existing screw threaded portions thereof at any suitable location between the master cylinder and the brakes. The other end of the conduit is also provided with screw threaded coupling means adapted to be connected in hydraulic communication with the hydraulic brake system of the towed vehicle also at any suitable location between the master cylinder and the brakes. Preferably the hydraulic connections between the master cylinder and brakes of the towed vehicle are temporarily broken and the open ends of hydraulic leads from the master cylinder are accordingly plugged or capped to keep the same clean and to prevent loss of brake fluid from the cylinder.

In order to permit filling of the flexible conduit between the two brake systems with hydraulic fluid, the conduit is provided with valve means and a coupling adapted to be detachably connected with a supplemental source of hydraulic fluid. Likewise the conduit is provided with bleeder valve means to permit escape of air upon filling the conduit with hydraulic fluid. As a further convenience shut-off means are preferably provided at the ends of the conduit to prevent leakage of fluid therefrom when the conduit is not in use.

Other objects of this invention will appear in the following description and appended claims, reference being had to the accompanying drawings forming a part of this specification wherein like reference characters designate corresponding parts in the several views.

In the drawings:

Fig. 1 is a schematic plan view of the chassis and hydraulic brake systems of two automobiles coupled together in tandem in accordance with conventional practice for cross-country transportation, showing a coupling device constructed in accordance with the present invention for hydraulically connecting the brake systems of the two automobiles.

Fig. 2 is a fragmentary enlarged elevation, partially in section to show details of construction, taken in the direction of the arrows substantially along the line 2—2 of Fig. 1 and illustrating a means for coupling the device of the present invention with the hydraulic brake system of the driven automobile.

Fig. 3 is a fragmentary enlarged elevation, partially in section, taken in the direction of the arrows substantially along the line 3—3 of Fig. 1 and showing a means for coupling the device of the present invention with the hydraulic brake system of the towed vehicle.

Fig. 4 is a fragmentary enlarged elevation, partially in section taken in the direction of the arrows substantially along the lines 4—4 of Fig. 1 and showing a means for filling the device of the present invention with hydraulic fluid.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, the chassis and wheels of two automobiles, indicated generally by the numerals 10 and 10', are schematically shown connected in tandem in accordance with conventional practice by means of a bifurcated drawbar 12 of rigid material connected at a universal joint 14 to a coupling member 16, which in turn is detachably secured by suitable means centrally to the rear transverse frame member 18 of the forward vehicle 10. Paired arms 20 of the drawbar 12 extend rearwardly to detachable connections at 22 with the forward ends of the lateral longitudinally extending frame sills 24' of the rear vehicle 10'.

By the connection shown, one driver may operate the vehicle 10. The vehicle 10' will trail or be towed in fixed spaced relationship and generally in longitudinal alignment with respect to the driven vehicle 10. This or similar arrangements are customary for hauling two vehicles from a final assembly plant to distributing regions as aforementioned, whereat the vehicles are uncoupled and sold individually. In the usual instance, the vehicles 10 and 10' will be completed automobiles, although they are illustrated schematically in the drawings to show the significant features of their hydraulic brake systems clearly. In the present instances, both vehicles 10 and 10' are identical, so that corresponding features of the two vehicles are indicated by the same numerals, each numeral of the towed vehicle 10' being distinguished by a prime. Thus a discussion of each vehicle 10 and 10' individually is unnecessary.

In the hydraulic brake system shown to illustrate an application of the present invention, a conventional foot-pedal 25 is mounted on the vehicle 10 and is operatively connected with the piston of a master cylinder 26 for subjecting hydraulic fluid within the master cylinder 26 to pressure. The cylinder 26 discharges to a distributor box 28 through a conduit 30 which is conventionally connected by flanged nuts 32 and 34 to the cylinder 26 and box 28 respectively. The ends of the conduit 30 are flared and the flanged nuts 32 and 34 are rotatably retained on the conduit 30 by said flared ends. In the present instance the nuts 32 and 34 screw on externally threaded tubular extensions or ribs 33 and 35 respectively of the cylinder 26 and box 28 respectively. Upon tightening the nuts 32 and 34 the corresponding flared ends of the conduit 30 are drawn against the ends of the ribs 33 and 35 in fluid tight seals in accordance with customary practice.

The box 28 is provided with a forward outlet which communicates with the hydraulically actuated brake mechanisms of the front wheels through a bifurcated conduit 36. Similarly the box 28 is provided with paired rearward outlets which communicate with the hydraulically actuated brake mechanisms of the left and right rear wheels respectively through conduits 38 and 40. The rearward extremity of each conduit 38 and 40 is connected by suitable screw threaded means to the inner forward end of one of each of a pair of flexible connector conduits 42. The outer or rearward end of each connector conduit 42 is operatively connected with the hydraulically actuated brake mechanism of the corresponding rear wheel. In the present instance, the rearward ends of the conduits 38, 40 are flared and a tubular threaded retainer 43 is rotatably held on each conduit 38 and 40 by the said flared ends. The retainers 43 are each provided with a projecting externally threaded portion 45, Fig. 2, which screws into a corresponding nut 44 provided on the end of each connector conduit 42 so as to draw the flanged ends of the conduits 38, 40 in a fluid tight seal against a corresponding annular seat within each nut 44.

It is apparent that when the hydraulic system is suitably filled with fluid and the pedal 24 is depressed, equal hydraulic pressures will be developed in the lines 36, 38, and 40 and the brakes at all four wheels will be applied simultaneously. The apparatus described thus far is conventional in operation and construction and comprises no part of the present invention per se. It has been discussed briefly merely to facilitate illustration of the construction and application of the invention now to be described.

As may be observed particularly in Fig. 1, a flexible hydraulic conduit of suitable length to extend between the coupled vehicles 10 and 10' is employed to couple the two hydraulic brake systems. In the present instance this conduit comprises a forward and rearward section 46 and 46a respectively, coupled at 47 as described hereinafter, and adapted to withstand the internal hydraulic pressure of a braking action. Preferably the conduit 46, 46a comprises a flexible rubber-like covering material reinforced internally by a woven or spirally wound flexible steel tubular core adapted to withstand the internal pressure of a braking action without expanding appreciably.

The forward end of the conduit 46 is provided with a metallic coupling element 48 having a hexagonal portion 50 adapted to be engaged by a tool such as a wrench, and an externally threaded extension 52. The latter is screwed into one end of a tubular valve type connector 54, which is selectively opened or closed by means of a manually operated valve 56.

The other end of the connector 54 is provided with an externally threaded extension 58 which is screwed into the socket element 60 of a ball and socket joint. The ball element 62 of the joint is provided with a screw threaded extension 64 which screws into a threaded opening 66 of a fitting 68. Thus when the valve 56 is in the open position, a continuous communication is provided between the bore of the conduit 46 and the fitting 68.

It will be understood that the present invention is not dependent upon the particular means shown to connect the forward end of the conduit 46 with the fitting 68, employing an intermediate swivel joint and valve comparable to the joint 60, 62 and valve 56. In fact, in certain instances, either or both the valve and swivel joint may be eliminated from the construction, although their use is usually preferred as will be apparent hereinafter.

The fitting 68 is provided with a longitudinal bore 70 opening at an enlarged threaded portion 72 through the wall of the fitting 68. The inner end of the bore 70 communicates at right angles with a transverse bore 74 which communicates in turn with the threaded opening 66.

A typical tubular internally threaded bleeder valve screw 76 is screwed into the threaded opening 72 and seats at its lower end against base 78 of the enlargement 72 so as to close the upper end of the bore 70. A plug screw 80 screws into the central bore of the screw 76 to seal the same from dirt. Details of the bleeder valve construction are described hereinafter in connection with Fig. 4.

Projecting oppositely from the sides of the fitting 68 and integral therewith are a pair of tubular nibs 82 and 84. The nib 82 is dimensioned and internally threaded so as to receive the threaded extension 45 of the hexagonal retainer 43 when the same is unscrewed from the nut 44, Figs. 1 and 2. The nib 84 is dimensioned and externally threaded so as to screw into the nut 44 at a fluid tight connection therewith when the latter is unscrewed from the extension 45. Extending coaxially through the opposed nibs 82, 84 is a transverse bore 88 in communication with the bore 70 and cooperating therewith to permit the fitting 68 to serve in effect as a T-coupling.

As indicated in Fig. 3, the rear end of the conduit 46a is connected with an adapter 90 by means identical in construction and operation with the means connecting the forward end of the conduit 46 with the fitting 68, including a metallic coupling 48a having a hexagonal portion 50a and a threaded extension 52a, a valve type coupling 54a having the valve 56a and threaded extension 58a, and the ball and socket joint 62a, 60a having the threaded extension 64a of the ball element 62a.

The latter extension 64a screws into a threaded opening of the fitting 90, which is similar to the opening 66. This opening communicates at right angles with a longitudinally extending bore 92 within the fitting 90. The bore 92 extends coaxially through an externally threaded nib 94, which projects outward from the sidewall of the fitting 90 and opens at its outer end to the exterior of the fitting 90. The nib 94 is integral with the fitting 90 and is dimensioned and threaded so as to receive the nut 32' and complete a fluid tight seal with the conduit 30' when the same is disconnected from the nib 33' of the master cylinder 26'. An air bleeder valve 76b, similar to the bleeder valve 76 and plugged by the screw 80b, is also screwed into a threaded opening in communication with the bore 92 through the side of the fitting 90. Thus the fitting 90 comprises in effect an L-coupling in communication with the conduit 46a via the valve coupling 54a and associated connecting elements.

In order to provide convenient means for filling the conduit 46, 46a with hydraulic brake fluid without depleting the existing fluid of the hydraulic brake systems of the two vehicles 10 and 10', means are provided for detachably connecting the conduit 46, 46a to a supplemental source of hydraulic fluid. To this end, a T-coupling 47 is provided, Fig. 4, having an internally screw threaded transverse bore 98 opening through opposed sidewalls of the coupling 47 and a bore 100 communicating at right angles with the bore 98 and extending through the body of the coupling 47 to an enlarged internally screw threaded portion 102. The latter is provided with a tapered valve seat 78c at its base and opens at its outer end to the exterior of the coupling 47.

A valve screw 76c, having an internally threaded bore 108 extending longitudinally of the screw 76c for the major portion of its length and opening at the outer end of the latter, is screwed into the enlarged opening 102. The inward extremity of the screw 76c is tapered at 110 to seat against the tapered valve seat portion 78c at a fluid tight seal therewith upon screwing the screw 76c tightly into the bore 102. A plurality of longitudinally extending openings 112 spaced symmetrically around the axis of the screw 76c open axially through the forward end thereof and communicate with the interior bore 108 thereof. The lower ends of the openings 112 are normally closed by the seat 78c when the latter is tightly abutted by the tapered end 110 of the screw 76c.

The threads and interior dimensions of the bore 108 are preferably adapted to fit a standard connection for a supplementary source of hydraulic brake fluid (not shown) and is sealed by a screw plug 80c which protects the bore 108 from dirt. Upon removal of the plug 80c and loosening the screw 76c so as to separate the seated portions 110 and 78c, the said coupling for the supplementary source of hydraulic fluid may be detachably screwed into the bore 108, whereby fluid may be forced into the conduit 98 through the openings 112 and 100. The valve 76c and its associated structure, including the central bore 108, plug screw 80c, openings 112, and abutment portions 78c and 110, are substantially identical in operation and construction to the aforementioned bleeder valve screws 76 and 76b and their associated structures. Accordingly these latter valves are not discussed in detail herein.

The openings of the transverse bore 98 to the exterior of the coupling 47 are threaded at 116 and 116a for receiving respectively the externally threaded ends 118 and 118a of tubular coupling members 120 and 120a respectively. The latter are suitably secured at fluid tight seals to the proximal ends of the conduits 46 and 46a respectively and are provided with hexagonal portions 122, 122a, whereby tightening and loosening of the threaded ends 118, 118a into the bore portions 116, 116a are facilitated. Thus the conduit sections 46 and 46a are in communication with each other by an unbroken conduit comprising the tubular couplings 120, 120a and the bore 98.

It is apparent from the foregoing that the conduit sections 46, 46a may be quickly and detachably secured to the existing hydraulic brake systems of the vehicles 10 and 10' with a minimum of effort and without impairing the operating efficiencies of the systems. This is accomplished by unscrewing the tubular connector 43 from the nut 44 at either one of the rear wheels, as for example the left wheel as indicated in Fig. 1, and then screwing the connector 43 tightly into the internally threaded extension 82 of the fitting 68, Fig. 2. The nut 44 is then tightly screwed onto the extension 84, so as to connect the conduit 42 with the conduit 38 through the bore 88. Thus the conduit 46 is tapped into the hydraulic brake system of the vehicle 10 without in any way interfering with the operation thereof. As shown in Fig. 2, the extension 82 is externally screw threaded in the same manner as the nut 44, so that the extension 82 may replace the nut 44 and be secured to the adjacent body structure of the vehicle 10, not shown, in substantially the manner that the nut 44 is ordinarily secured to said adjacent body structure.

The nut 32' of the conduit 30' is also unscrewed from the threaded tip 33' of the master cylinder 26' and is screwed tightly onto the externally threaded extension 94 of the fitting 90, Fig. 3. The exposed extension 33' is then preferably closed by an internally screw threaded capping nut 124, as indicated in Fig. 1, to prevent loss of hydraulic fluid from the master cylinder 26' and to protect the same from dirt during the time that it is temporarily disconnected from the conduit 29'. Thus the conduit 46a is in direct communication with the hydraulic brake system of the vehicle 10' for operation thereof in synchronism with the brake system of the vehicle 10 as described below.

If the conduit sections 46, 46a are not already filled with hydraulic fluid, the plug screw 80c is unscrewed from the valve screw 76c and the latter is loosened in the bore 102 to separate the seated elements 78c and 110 to permit communication between the bores 108 and 100 through the openings 112. The aforementioned coupling elements for a supplemental source of hydraulic fluid is then screwed into the bore 108 and hydraulic fluid is forced into the conduit sections 46, 46a by way of the bore 98 and coupling elements 120, 120a. The valves 56 and 56a will of course be in the open position at this time. Also the screw plugs 80 and 80b are loosened or removed from their respective bleeder valves 76 and 76b and the latter are unseated to afford communication between the bleeder openings of these valves and the corresponding bores 70 and 92.

As hydraulic fluid is forced through the bore 108 of the valve screw 76c and into the conduit portions 46 and 46a, air in the system is released through the bleeder valve screws 76 and 76b at the opposed ends of the conduit portions 46, 46a. When it has been ascertained that the entire hydraulic system is filled with fluid, as for example by the escape of fluid through the bleeder valves 76, 76b, the supplemental source of hydraulic fluid is unscrewed from the valve screw 76c and the various bleeder valves 76, 76b, 76c are tightly screwed to their seated positions to seal the system against loss of fluid. The various plug screws 80, 80b, 80c are then replaced within their respective screws 76, 76b, 76c to seal the latter from dirt, and the system is ready for operation.

It is to be understood that the specific coupling elements 68 and 90 and the means for connecting the same with the hydraulic brake systems of the vehicles 10 and 10' will of course be modified to suit particular requirements and will necessarily vary from one type of automobile to another. The connection of the conduit section 46 with the hydraulic brake system of the driven vehicle 10 may of course be made at any place below the master cylinder 26, i. e. between the piston of the latter and any of the brake actuating mechanisms.

Similarly, the connection of the rearward end of the conduit section 46a may be made at any location along the hydraulic brake system of the towed vehicle 10' below the piston of the master cylinder 26'. It is not essential to disconnect the master cylinder 26' from the remainder of the hydraulic system, although this is usually preferred in order to prevent fluid from backing into the master cylinder 26' and to assure rapid effective response of the brake systems in response to operation of the foot-pedal 24.

In some hydraulic brake systems, instead of the single conduit 30' communicating with the master cylinder 26', two or more conduits may leave the cylinder 26' and extend directly to the brake actuating mechanisms at the various wheels, omitting the distributor box 28'. In such a situation, the fitting 90 will of course be provided with an extension 94, in communication with the conduit 46a, for each hydraulic lead leaving the master cylinder 26', unless these leads are in communication with each other through the master cylinder and it is not deemed necessary to disconnect the master cylinder of the towed vehicle from the brake system while employing the device of the present invention.

In operation of the foregoing structure, it is merely necessary for the driver of the vehicle 10 to apply the foot brake 24 in order to effect a simultaneous braking action on all four wheels of both vehicles 10 and 10'. The pressure in the hydraulic lines of both vehicles will be the same, so that the braking action on each vehicle will also be the same. Thus both vehicles will be braked in unison at all times, avoiding the aforementioned disadvantages of unequal braking forces exerted by the two vehicles. Similarly, upon release of the foot pedal 24, the braking force on the two vehicles will be released in unison.

By equalizing the braking action on the two vehicles, each will stop substantially independently of the other, substantially as if no mechanical coupling such as the drawbar 12 existed therebetween. Thus excessive wearing of the tires of one vehicle or the other and the danger of jackknifing the towed vehicle 10' around its pivot 14 and throwing the driven car 10 out of control are avoided. Wrenching or straining of the frames of either vehicle or of the tow bar 12, which would normally result from unequal braking forces, is also substantially entirely eliminated.

Likewise, the greatest problem of cross-country towing, that of stopping quickly from high speed, is automatically solved without the requirement of specialized training or skill on the part of the driver. In fact, actual road tests have proved that the two vehicles 10 and 10' coupled in tandem as shown may be stopped with safety in a shorter distance and in less time than when either of the vehicles is driven singly, and much more quickly than heretofore when the driver was required to operate dual brake control systems for the two vehicles. This result is believed to be due in part at least to the steadying influence of the weight of the towed vehicle 10' connected at 14 to the rear of the driven vehicle 10. Thus sideway of the latter vehicle during an emergency stop is prevented, permitting the same to be feasibly stopped more rapidly than if it were not connected to the towed car 10'.

When the vehicles 10 and 10' reach their destination, the valves 56 and 56a are turned to the off position to prevent loss of fluid from the conduit 46, 46a, and the latter is disconnected from the brake systems of the two vehicles. Thereafter, the brake conduits 42 and 38 are directly connected together by the connecter 43 and nut 44, and the lead 30' is connected to the master cylinder 26' by screwing the nut 32' on the nib 33', restoring the brake systems to their original conditions. The conduit 46, 46a may then be coiled into a compact package and stored in a container until the next use.

Although the application of the present invention has been described in connection with the towing of automobiles, it is to be understood that the invention may also be employed as a coupling between the hydraulic brakes of an automobile and a trailer, such as a camping or house trailer, or in other towing operations.

I claim:

1. A hydraulic braking device for the automotive transport of a driven vehicle mechanically coupled with a towed vehicle, comprising the combination of a pair of hydraulic brake systems for the driven and towed vehicles respectively, each system comprising respectively a mechanically actuated hydraulic pressure exerting master cylinder having discharge outlet means, hydraulically actuated brake means, and a hydraulic conduit system connected with the brake means and having coupling means, a direct and continuous hydraulic connection between the brake means of the towed vehicle and the master cylinder of the driven vehicle comprising a hydraulic conduit detachably connected at one end with the coupling means of the conduit system of the towed vehicle and detachably connected at the other end with the conduit system of the driven vehicle, means plugging the discharge outlet means of the master cylinder of the towed vehicle, the coupling means of the conduit system of the driven vehicle being connected with said outlet means of the master cylinder of the latter vehicle, said conduit having inlet valve means intermediate its ends and detachably connectible with a source of hydraulic fluid for filling the conduit, and valve means at opposite ends of the conduit for selectively closing said ends to trap fluid within the conduit.

2. A portable device for coupling the hydraulic brake conduits of a driven and a towed automobile to cause application of the brakes of the towed automobile substantially simultaneously with application of the brakes of the driven automobile, the combination of a flexible hydraulic conduit adapted to be repeatedly coiled and uncoiled, inlet valve means intermediate the ends of said conduit and detachably connectible with a source of hydraulic fluid for filling the conduit, valve means adjacent opposite ends of the conduit respectively and adapted to be selectively closed to trap fluid in said conduit, an air bleeder valve near each end of the conduit, and a pair of pivotal coupling members at opposite ends of the conduit respectively, each coupling member being adapted to be connected with a hydraulic system and to be pivotal on said conduit when thus connected.

3. A portable device for coupling the hydraulic brake conduits of a driven and a towed automobile to cause application of the brakes of the towed automobile substantially simultaneously with application of the brakes of the driven automobile, the combination of a flexible hydraulic conduit adapted to be repeatedly coiled and uncoiled, inlet valve means intermediate the ends of said conduit and detachably connectible with a source of hydraulic fluid for filling the conduit, valve means adjacent opposite ends of the conduit respectively and adapted to be selectively closed to trap fluid in said conduit, and a pair of coupling members at opposite ends of the conduit respectively.

4. A portable device for coupling the hydraulic brake conduits of a driven and a towed automobile to cause application of the brakes of the towed automobile substantially simultaneously with application of the brakes of the driven automobile, the combination of a flexible hydraulic conduit adapted to be repeatedly coiled and uncoiled, inlet valve means intermediate the ends of said conduit and detachably connectible with a source of hydraulic fluid for filling the conduit, valve means adjacent opposite ends of the conduit respectively and adapted to be selectively closed to trap fluid in said conduit, an air bleeder valve near each end of the conduit, a fitting at one end of the conduit having a single screw threaded hydraulic coupling communicating with the conduit through the fitting, and a second fitting at the other end of the conduit having two screw threaded hydraulic couplings communicating with the conduit through the second fitting.

5. A portable device for coupling the hydraulic brake conduits of a driven and a towed automobile to cause application of the brakes of the towed automobile substantially simultaneously with application of the brakes of the driven automobile, the combination of a flexible hydraulic conduit adapted to be repeatedly coiled and uncoiled, inlet valve means intermediate the ends of said conduit and detachably connected with a source of hydraulic fluid for filling the conduit, valve means adjacent opposite ends of the conduit respectively and adapted to be selectively closed to trap fluid in said conduit, a pair of air bleeder valves adjacent opposite ends of the conduit respectively, each bleeder valve being located at least as close to the adjacent end of the conduit as is the adjacent valve means, and a pair of coupling members at opposite ends of the conduit respectively.

References Cited in the file of this patent

UNITED STATES PATENTS

| Number | Name | Date |
|---|---|---|
| 689,799 | Graves | Dec. 24, 1901 |
| 755,901 | Mally | Mar. 29, 1904 |
| 1,784,547 | Schmidt et al. | Dec. 9, 1930 |
| 1,892,535 | Sanders | Dec. 27, 1932 |
| 1,986,799 | Dickey | Jan. 8, 1935 |
| 2,065,017 | Oliver | Dec. 22, 1936 |
| 2,146,545 | Leighton | Feb. 7, 1939 |
| 2,184,042 | Harrington | Dec. 19, 1939 |
| 2,207,228 | Seppmann | July 9, 1940 |
| 2,247,827 | Wegmann | July 1, 1941 |
| 2,287,633 | Newcum | June 23, 1942 |
| 2,325,846 | Forbes | Aug. 3, 1943 |
| 2,393,679 | Gunderson | Jan. 29, 1946 |